United States Patent [19]

Takebayashi et al.

[11] Patent Number: 4,783,802

[45] Date of Patent: Nov. 8, 1988

[54] LEARNING SYSTEM OF DICTIONARY FOR SPEECH RECOGNITION

[75] Inventors: Yōichi Takebayashi, Chigasaki; Hidenori Shinoda, Yokohama, both of Japan

[73] Assignee: Kabushiki Kaisha Toshiba, Kawasaki, Japan

[21] Appl. No.: 775,398

[22] Filed: Sep. 12, 1985

[30] Foreign Application Priority Data

Oct. 2, 1984 [JP] Japan ................................ 59-206656

[51] Int. Cl.$^4$ .............................................. G10L 1/00
[52] U.S. Cl. ....................................... 381/41; 381/43; 381/42; 364/513.5
[58] Field of Search ....................... 381/36, 41, 42, 43, 381/44, 45, 46, 51, 57; 364/513.5; 382/15, 18, 30, 14, 37; 367/198; 340/365 R; 379/37, 88, 199; 434/389, 314, 321, 323, 335

[56] References Cited

U.S. PATENT DOCUMENTS

| | | | |
|---|---|---|---|
| 4,059,725 | 11/1977 | Sakoe | 381/43 X |
| 4,394,538 | 7/1983 | Warren et al. | 381/43 |
| 4,581,755 | 4/1986 | Sakoe | 381/42 |
| 4,593,403 | 6/1986 | Kishi et al. | 364/513.5 X |
| 4,618,983 | 10/1986 | Nishioka et al. | 381/43 |
| 4,618,984 | 10/1986 | Das et al. | 381/43 |
| 4,624,011 | 11/1986 | Watanabe et al. | 381/43 |
| 4,633,499 | 12/1986 | Nishioka et al. | 381/43 |
| 4,667,341 | 5/1987 | Watari | 381/43 |

FOREIGN PATENT DOCUMENTS

3048107 9/1981 Fed. Rep. of Germany.

OTHER PUBLICATIONS

C. C. Tappert et al., "Fast Training Method for Speech Recognition Systems", IBM Technical Disclosure Bulletin, vol. 21, No. 8, Jan. 1979, pp. 3413, 3414.
E. Reuhkala, "Pattern Recognition for Strings of Discrete Symbols", Proceedings of the 6th Int'l Conference on Pattern Recognition, Oct. 19, 20, 1982, pp. 969–972.
N. Ishii et al. "Speaker–Independent Speech Recognition Unit Development for Telephone Line Use", Japan Telecommunications Review, No. 3, vol. 24, Jul., 1982, pp. 267–274.
C. Lee, et al., "Speech Recognition Under Additive Noise", IEEE International Conference on Acoustics, Speech and Signal Processing 84, vol. 3, 19–21, Mar., 1984, pp. 35.7.1–35.7.4.

Primary Examiner—William M. Shoop, Jr.
Assistant Examiner—Paul Ip
Attorney, Agent, or Firm—Foley & Lardner, Schwartz, Jeffery, Schwaab, Mack, Blumenthal & Evans

[57] ABSTRACT

The learning method of reference pattern vectors for speech recognition in accordance with the present invention, a plurality of speech feature vectors are generated from the time series of speech feature parameter for the input speech pattern, by taking into account knowledge concerning the variation tendencies of the speech patterns, and the learning (preparation) of reference pattern vectors for speech recognition is carried out by the use of these speech feature vectors thus generated. Therefore, it becomes possible to prepare highly reliable reference pattern vectors in an easy manner from a small number of speech patterns, which makes it possible to achieve an improvement in the speech recognition factor. In particular, it becomes possible to plan an easy improvement of the reference pattern vectors by an effective use of a relatively small number of input speech patterns.

34 Claims, 5 Drawing Sheets

LEARNING SYSTEM OF DICTIONARY FOR SPEECH RECOGNITION

BACKGROUND OF THE INVENTION

1. Field of the Invention

The present invention relates to a method of and a device for learning reference pattern vectors for speech recognition for an effective improvement of the recognition performance for a speech recognition device.

2. Description of the Prior Art

The recent development in the techniques for pattern recognition such as character recognition and speech recognition has been remarkable. In the field related to speech, too, devices for recognizing spoken word and the like are being put into practical use. However, majority of the speech recognition devices are constructed in such a way as to warp the input speech pattern along the time axis by means of the dynamic programming method (DP matching method). These devices recognize the input speech pattern, by matching the input speech pattern that is normalized through the warping in the time axis with the reference patterns (standard pattern) that has been prepared in advance.

However, the prior art speech recognition device with the above construction has a weakness that its recognition capability, that is, the recognition rate is reduced by undergoing various kinds of deformation in the speech pattern under the influence of the level shift in the input speech pattern, variations in the utterance speed, variations due to the speaker, variations introduced by the public telephone line, variations due to the pitch of the speech, variations due to the background noise, and the like. In particular the decreasing tendency in the recognition performance accuracy, such as the decreasing tendency in recognition performance accuracy as mentioned in the above will reveal itself more conspicuously in the telephone word speech recognition device which is aimed at an unspecified majority of speakers or in the word speech recognition device with numerous categories of recognition objects, and further, in the recognition device for phonemes and syllables, remaining as problem to be solved in the speech recognition techniques.

In the meantime, it has been well known from the standpoint of the statistical pattern recognition theory that there is a method for improving the recognition capability (recognition performance accuracy) by carrying out the learning of the reference pattern vectors for speech recognition based on the use of a large number of speech patterns that have been collected beforehand. In the above learning method, the larger the number of collected speech patterns is, the higher the recognition score is, due to the corresponding improvement in the capabilities of the reference pattern vectors for speech recognition. However, for a speech recognition device with large number of categories of objects to be recognized or for a word speech recognition device in which practically there are required frequent changes of vocabulary it becomes necessary, in order to improve the recognition performance accuracy, to collect a very large number of speech patterns, which has been difficult to accomplish in practice. In particular, in the case of a speech recognition device for an unspecified speaker, there has been a problem that a reference pattern vectors may not be sufficiently designed based only on a small number of speech patterns. Moreover, in the case of a speech recognition device for a specified speaker or a speech recognition device of the speaker-adapted type, the inputting of the speech pattern is made by uttering of the same category by an identical speaker for a large number of times in order to allow for the variations due to the speaker. This bears burden to the user but also results a significant loss in time.

SUMMARY OF THE INVENTION

An object of the present invention is to provide a speech recognition device which is capable of improving the recognition accuracy of the speech recognition device.

Another object of the present invention is to provide a method of and a device for learning the reference pattern vectors for speech recognition which is capable of learning the reference pattern vectors for speech recognition by an effective use of a small number of speech patterns.

Another object of the present invention is to provide a method of and a device for learning the reference pattern vectors for speech recognition by taking into account the various variation tendencies of the speech feature vectors.

Another object of the present invention is to provide a method of and a device for learning the reference pattern vectors for speech recognition which make it possible to easily prepare a highly reliable reference pattern vectors by use of the recognition feature vectors modified through the use of a prior knowledge concerning linguistics, phonetics, acoustics or speaker and noise.

One of the features of the present invention is that, in extracting the speech feature vectors needed in building a reference pattern vectors for speech recognition out of a portion of the time series of a speech feature parameter obtained by analyzing the input speech, it is arranged to extract a plurality of speech feature vectors out of a time series of speech feature parameter, by taking into account various variation tendencies in the speech feature vectors caused by the variations in the level of input speech, variations in the utterance speed, variations due to speaker, variations due to telephone line, variations due to fundamental frequency of the speech, variations due to background noise, and so forth, in learning the reference pattern vectors for speech recognition by the use of the speech feature vectors thus extracted.

That is, by utilizing the knowledge concerning the factors for the pattern variations in the input speech pattern, the speech feature vectors other than those speech feature vectors used in actual recognition processing are extracted also out of the time series of the feature vectors for the input speech to carry out the learning of the reference pattern vectors for speech recognition by the use of these speech feature vectors.

These and other objects, features and advantages of the present invention will be more apparent from the following description of preferred embodiments, taken in conjunction with the accompanying drawings.

DESCRIPTION OF THE PREFERRED EMBODIMENTS

Figure 1:
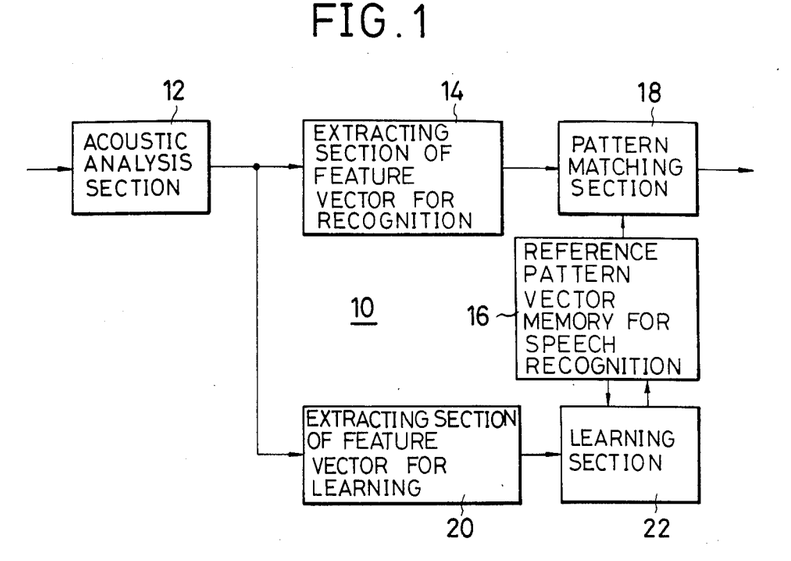
FIG. 1 is a simplified block diagram of a word speech recognition device embodying the present invention.

Referring to FIG. 1, a speech recognition device embodying the present invention is shown with a reference number 10.

The speech recognition device 10 includes an acoustic analysis section 12 which analyzes an input speech for each of a fixed period of frame for analysis in order to output the input speech as a time series of the feature parameter for input speech through a speech input section such as a microphone, recognition feature vector extracting section 14 which extracts a portion of the time series of the speech feature parameter from the acoustic analysis section 12 as input speech feature vector, a reference pattern vector memory for 16 which memorizes in advance the reference pattern vectors for speech recognition, and a pattern matching section 18 which compares the patterns between the feature vectors extracted from the input speech from the recognition feature vector extracting section 14 and the reference pattern vectors at the speech reference pattern vector memory 16. It further includes learning feature vector extracting section 20 which extracts feature vectors used for the processing, out of the time series of the speech feature parameter from the acoustic analysis section 12, as well as other feature vectors that take into account of the variation tendencies of the above feature vectors, and a learning section 22 which generates a reference pattern vectors for speech recognition using the feature vectors for learning that are supplied by the learning feature vector extracting section 20, in order to supplement or update the reference pattern vectors in the reference pattern vector memory 16. In adding, a reference pattern vector learning device 24 is composed of the learning feature vector extracting section 20 and the learning section 22.

Figure 3:
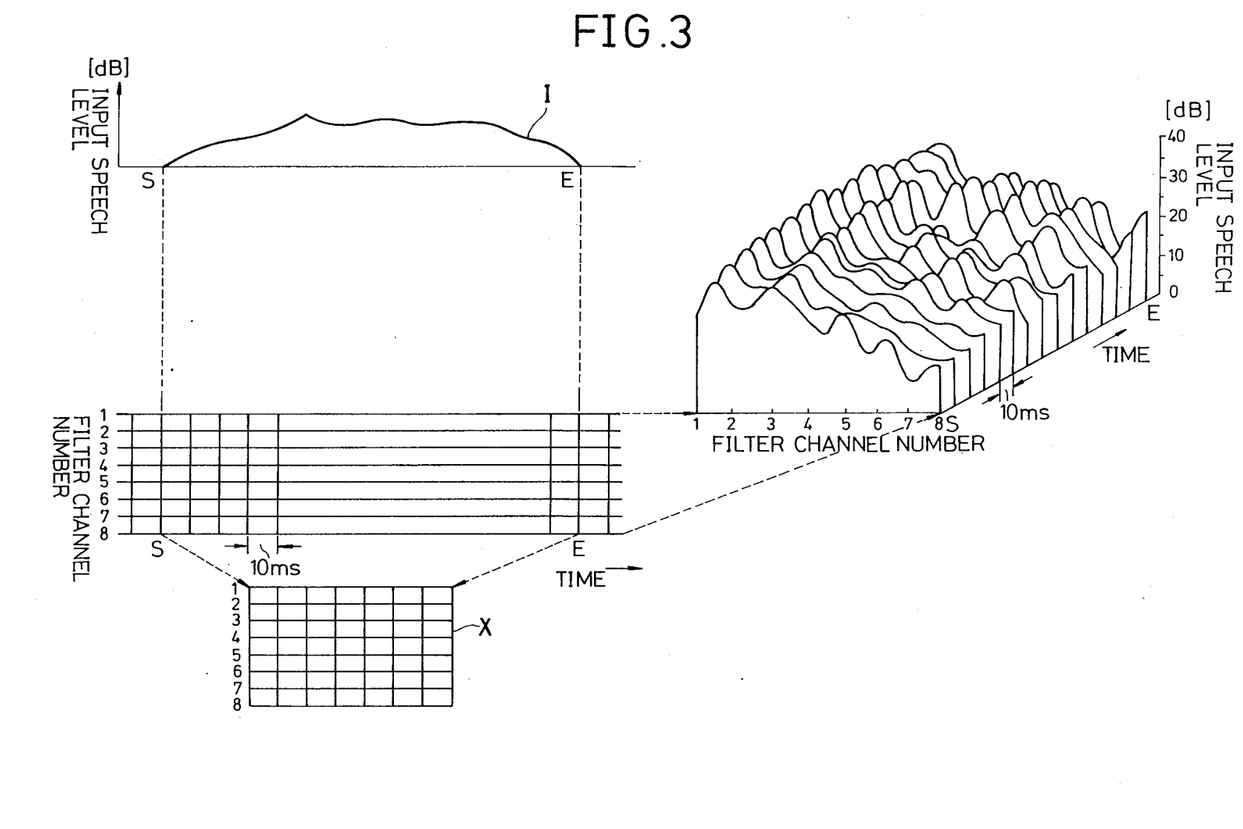
FIG. 3 is a diagram for illustrating the extracting concept of the recognition feature vectors.

Next, referring to FIGS. 1 and 3, the operation of the speech recognition device 10 will be described.

The input speech which is introduced through a microphone or the like is led, after transformed to a digital signal by an A/D converter with sampling frequency of 8 kHz, say, to the acoustic analysis section 12 consisting, for example, of an eight-channel filter bank, and is analyzed at a fixed period of frame analysis, for example, at every 10 ms, to be output as a time series of its speech feature parameter. Here, the speech feature parameter may be a parameter which is obtained either by a digital signal processing, namely, the frequency spectrum derivable by square-law detecting each of the output of the eight-channel filter bank, the cepstrum coefficient, the LPC coefficient, or the discrete Fourier transform, or by an analog analysis method such as the switched capacitor filtering or the analog filtering. The processing for speech recognition and the preparation (learning) of the reference pattern vector are ordinarily carried out by the use of some of these feature parameters. It is to be noted that since the processing for the acoustic analysis has no direct bearing on the main object of the present invention, the ensuing description will be given on the assumption that the acoustic analysis section 12 is composed of an eight-channel filter bank.

Now, the recognition processing for the input speech is carried out by extracting a portion of the time series of the short-term frequency spectrum which represents the output of the eight-channel filter bank in the analysis section 12, as the feature vectors for the input speech. In this case, the method for extracting the feature vectors will vary depending upon the unit, such as word, syllable, or phoneme, of the speech which constitutes the object of the recognition.

Taking the case of the word speech recognition, in which the variations in the speech level is taken into account as an example, the extracting section of speech feature vector for recognition 14 determines first, for example, the starting point S and the ending point E of the input speech by means of the power level change, the duration, or others, of the speech. The time segment between the starting point S and the ending point E of the input speech thus determined is divided equally, for example, into seven segments as shown in FIG. 3. By selectively extracting the outputs from the filter bank at each of the eight time points chosen, including the starting and the ending points, a 64 (=8×8) dimensional vector, corresponding to the eight points in the direction of the time axis and the eight channels in the direction of the frequency axis, is extracted as a speech feature vector for the input speech. It is needless to say that the feature vector is extracted by the use of other techniques when the object to be recognized is other than a word.

The pattern matching section carries out the matching of patterns between the reference pattern vectors for speech recognition stored in advance in the speech reference pattern vector memory 16 and the speech feature vector extracted in the above manner by the use of, for example, the method of compound degree of similarity multiple similarity method or subspace method. Namely, at the pattern matching section 18, the pattern comparison between the reference pattern vectors which has been prepared in advance for each of the object word to be recognized and the speech feature vector $X$ is carried out by computing the value of the compound degree of similarity according to the following equation.

$$S^{(l)} = \sum_{m=1}^{M} a_m^{(l)} (x, \phi_m^{(l)})^2,$$

In the above equation, the reference pattern vectors a for speech recognition for a word l is given by a fixed vector $\phi_m^{(l)}$, with $a_m^{(l)}$ as a constant. The pattern matching section 18 computes the value of the degree of similarity $S^{(l)}$ between the feature vector $X$ for the input speech and the reference pattern vectors of words registered in the reference pattern vectors memory 16 as recognition object, for each of the word, to output the word l that gives the maximum degree of similarity $S^{(l)}$ as the result of the recognition. The word recognition of the input speech is accomplished by the process as described in the above.

The method according to the present invention is one which makes it possible to efficiently learn the reference pattern vectors for speech recognition that is utilized for the pattern matching as in the above and improves and enhances the capabilities of the reference pattern vectors. The description about the method will be given in what follows.

Now, while the learning of the reference pattern vectors for speech recognition is in progress, the extracting section of feature vector for learning 20 extracts feature vectors to be used for recognition, based on the output from the eight-channel filter bank in the acoustic analysis section 12, as well as extracts other feature vectors for learning processing that take into account of the variation tendencies in the first-mentioned feature vectors. In other words, the extracting section of feature vector 20 is extracting a plurality of speech feature vectors for learning, including those feature vectors that are served for the recognition processing, out of a time series of one feature parameter that is obtained at the acoustic analysis section 12 by analyzing the input speech.

Figure 2:
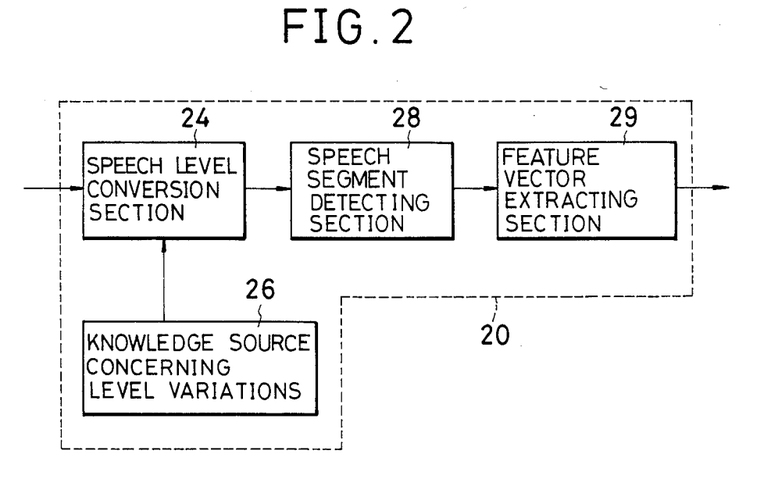
FIG. 2 is a block diagram of the extracting section of feature vectors for learning in the device shown in FIG. 1.

Referring to FIG. 2, the construction of the learning feature vector extracting section 20 will be described in the case of aiming at the word speech recognition as was mentioned earlier.

Figure 4:
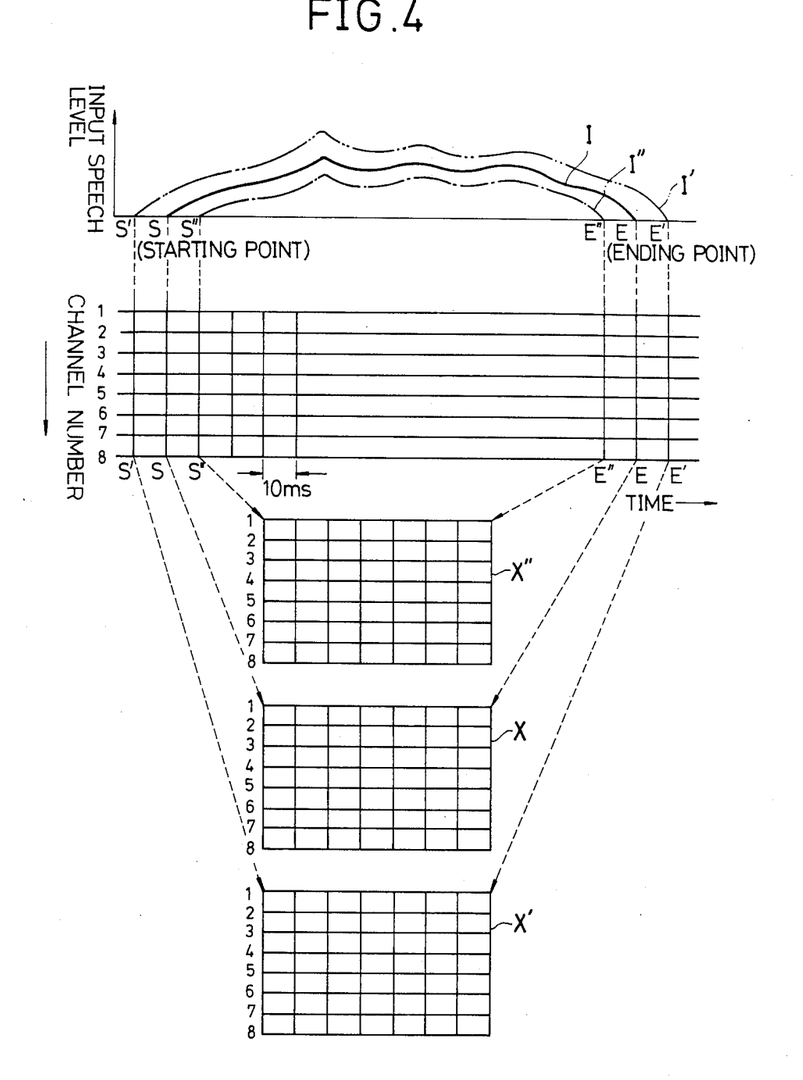
FIG. 4 is a diagram for illustrating the extracting concept of the feature vectors for learning in word recognition that take into account of the power level variations in the input speech.

The extracting section of feature vector for learning 20 comprises a speech level conversion section 24, a knowledge source 26 concerning the level variations, a speech segment detecting section 28, and an extracting section of word feature vector 29. First, the speech level conversion section 24, according to the knowledge concerning the level variations which comes from the knowledge source 26, intentionally increases or decreases the output level of the time series for the feature parameter that comes from the acoustic analysis section 12, by considering the variations in the power level of the input speech. In other words, it changes the value of the output from the eight-channel filter bank into several steps, for example, three steps within the range of ±10 dB, to obtain a plurality of kinds of time series for a feature parmameter, for instance, I, I', and I'' as shown in FIG. 4. Concerning these time series I, I', and I'', the starting and ending points S and E of the speech are detected respectively by the speech segment detecting section 28, and their respective feature vectors $\varkappa$, $\varkappa'$, and $\varkappa''$ are detected by the extracting section of feature vector 29 to be given to the learning section 22. At the learning section 22, the covariance matrix is obtained for the plurality of feature vectors for learning thus found for the input speech, and the reference pattern vectors for speech recognition is computed through such operation as the KL expansion of the covariance matrix. A reference pattern vectors obtained in this manner is given to the reference pattern vectors memory for speech recognition 16 to supplement or update the reference pattern vectors memory 16.

The above description was made in conjunction with the learning processing of reference pattern vectors for speech recognition in which use was made of the method of compound degree of similarity. Needless to say, the processing of the reference pattern vectors learning will vary depending upon the method adopted from among other various methods for discrimination, such as the subspace method, the Maharanobis' distance, and the maximum likelihood method. In other words, regardless of the discrimination method adopted for the recognition processing, it is only necessary to carry out the learning of the reference pattern vector by extracting a plurality of speech feature vectors for learning, in adding to the speech feature vectors to be used for recognition, by considering, for example, the variation tendencies of the speech patterns, out of the time series of one feature parameter that is obtained by analyzing the input speech.

In this way, according to the present system, a plurality of feature vectors can be extracted from an input speech by making an advantageous use of an a priori knowledge concerning the input speech.

Therefore, it becomes possible to obtain a large amount of learning information out of a small amount of information on the input speech, and to carry out an efficient learning of reference pattern vector by the use of the information for learning obtained in this manner. For example, as a prior knowledge on the level of an input speech, it is generally known that there are created variations in the level of the input speech that are caused by the loudness of utterance, the difference in the distance between the speaker and the microphone, the variations in the amplification factor, and the like. Accordingly, in this case, in adding to the feature vector $\varkappa$ for a word speech that is obtained by detecting the starting and ending points S and E of the word speech from the original speech pattern, and dividing the length of the word speech into seven equal sections, there will be obtained word feature vectors $\varkappa'$ and $\varkappa''$ that are different from the feature vector $\varkappa$, based on the pairs of the starting and ending points S', E' and S'', E'' for the speech pattern, by varying the input speech level, for example, by ±10 dB.

In this way, it becomes possible to carry out the learning of the reference pattern vector by increasing the data amount for the feature vectors to be utilized for the learning. Moreover, if the a priori knowledge concerning the changes and scaling of utterance, in adding to the level variations described in the above, is utilized, it becomes possible, through changes in the resampling points of the speech feature vectors by considering the temporal tendencies in the variations of utterance, to aim at an increase in the data amount for the feature vectors to be used for the learning of the reference pattern vector by the preparation of a plurality of word feature vectors for learning.

In adding, it is also possible to make an advantageous use, besides the variations in the time axis direction of the input speech patterns, of the knowledge concerning the variations in the frequency axis direction, such as the variations due to speaker that will occur when unspecified speakers are to be considered or the variations due to the frequency features of the telephone line. In concrete terms, extracting of the feature vectors for learning will become more effective if an active use is made, for example, of the output of the eight-channel filter, that is, the slope of the frequency spectrum, the variations in the formant frequencies, or the knowledge concerning the influence of the pitch frequency.

Moreover, the present invention is not limited to the embodiment that has been described in detail. Thus, for example, it may as well be applied, besides the word speech recognition described in the foregoing, to the phoneme recognition, syllable recognition, connected words recognition, vowel recognition, or the like. Also, in the case of vowel recognition by the use of the speech parameter corresponding to one frame, the learning of the reference pattern vector can be made more effectively if a plurality of feature vectors for learning are obtained by utilizing the previously mentioned level variations or by modifying the slope of the variation spectrum for the formant.

Furthermore, in the connected word recognition, too, if the extracting of the word feature vectors is carried out, for example, by changing the word boundaries as plural, a highly efficient reference pattern vectors learning will become possible by the use of a small number of patterns. Moreover, in the single syllable recognition or the consonant recognition, as well, it may be arranged to extract a plurality of time-frequency spectra by shifting the time axis, on the recognition of the shift of the feature vectors in the direction of the time.

Figure 5:
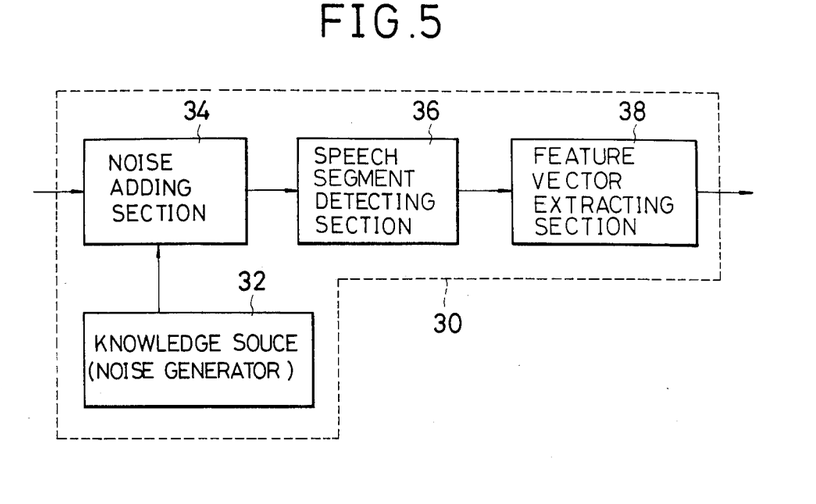
FIG. 5 is a schematic block diagram of a modification to the recognition device shown in FIG. 1 in which the influence of noise on the pattern variation is taken into account.

Referring to FIG. 5, a modification to the learning feature vector extracting section for the speech recognition device shown in FIG. 1 is illustrated with reference numeral 30.

In order to take into account the influence of the background noise, it is arranged in the modification to obtain the feature vectors for learning by adding, several noises that are prepared beforehand with appropriately assigned levels, at the learning feature vector extracting section. The learning feature vector extracting section 30 of the modification comprises a knowledge source 32 which comprises a noise generator for supplying knowledge concerning the noise, a noise adding section 34 which adds the noise from the noise generator 32 to the time series of the speech feature parameter from the acoustic analysis section 12, a speech segment detecting section 36 which detects the starting and ending points S and E of the time series to which is added the noises, and an extracting section of word feature vector 38 which extracts the feature vectors from the time series.

A device which is arranged in this manner permits an easy preparation of a reference pattern vectors that takes the noise influence into account, bringing about an enormous practical advantage. It should be noted in the example shown in FIG. 5 that the speech signal and the noise signal are added on the level of time signal. That is, analog or digital time series signals are added at the noise adding section 34.

Figure 6:
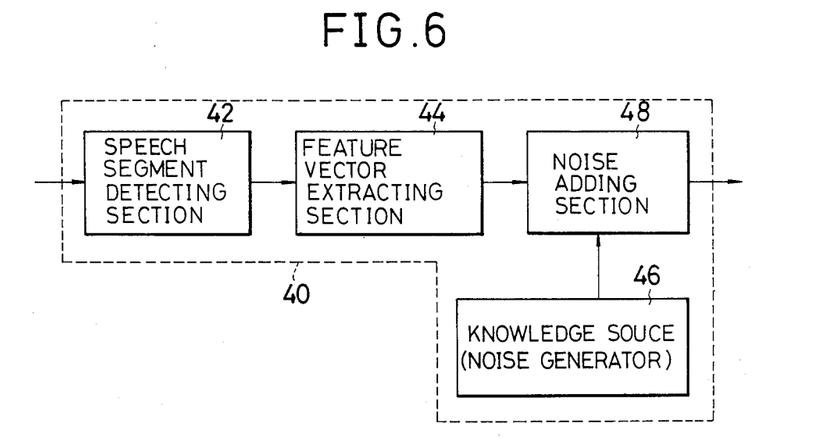
FIG. 6 is a schematic block diagram of a modification to the extracting section of the feature vectors for learning in the device shown in FIG. 1 in which the influence of noise on the pattern variation is taken into account.

Referring to FIG. 6, another modification to the learning feature vector extracting section of the speech recognition device as shown in FIG. 1 is illustrated with reference numeral 40. The learning feature vector extracting section 40 comprises a speech segment detecting section 42 which detects the starting and ending points S and E of the time series of the feature parameter which comes from the acoustic analysis section 12, a feature vector extracting section 44 which extracts the feature vectors of the time series for which the starting and ending points are specified, a knowledge source 46 which comprises a noise generator for supplying knowledge concerning the noises, and a noise adding section 48 which adds the noises from the noise generator 46 to the feature vector from the feature vector extracting section 44. Analogous to the previous embodiment, the present embodiment possesses an advantage that it permits an easy preparation of a reference pattern vectors that takes into account the influence of the noises. In the example shown in FIG. 6, both of the noise generator 46 and the noise adding section 48 operate based on digital processing. For example, when the logarithmic power spectrum is output from the extracting section of feature vectors 44, it is necessary to convert the logarith to a linear power spectrum once to be added to the noise, and then to reconvert back to logarithm again.

Figure 7:
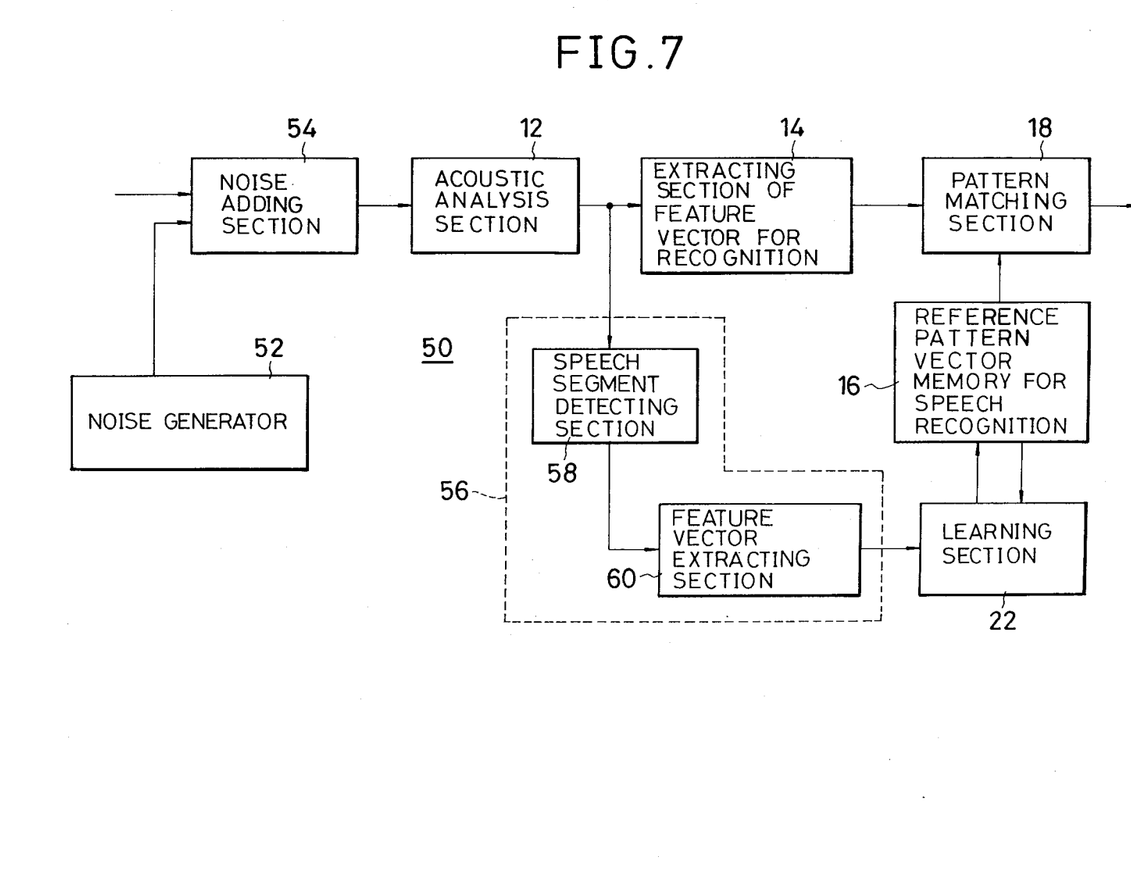
FIG. 7 is a schematic block diagram of a second embodiment of the word speech recognition device in accordance with the present invention in which the influence of noise on the pattern variation is taken into account.

Referring to FIG. 7, a second embodiment of the speech recognition device in accordance with the present invention is shown with reference numeral 50.

In the embodiment, it is arranged that the noises from a noise generator 52 are added at a noise adding section 54 to the input speech which is sent from the speech inputting section, to be supplied to the acoustic analysis section 12.

An learning feature vector extracting section 56 comprises a speech segment detecting section 58 which detects the starting and ending points S and E of the time series for the feature parameter which comes from the acoustic analysis section 12 and a feature vector extracting section 60 which extracts feature vectors of the time series for which the starting and ending points are specified.

With a construction as in the second embodiment, it becomes possible to prepare easily a reference pattern vectors that takes the noise influence into account. In the case shown in FIG. 7, the noise generator 52 and the noise adding section 54 can be constructed to operate in either digital or analog mode.

The preparation system of a speech reference pattern vector by taking into account the effect of the noise, as described in conjunction with FIGS. 5 to 7, is an epoch-making system whose standpoint is diametrically opposite to that of the prior art system in which the noise is treated to be removed. It is a powerful method for settling the problem concerning the noise in speech recognition.

It is to be mentioned that the reference pattern vectors learning system in accordance with the present invention is also applicable to the recognition of patterns in the acoustic signals and the vibration signals that are different from the speech. Thus, for example, it is applicable to the case of diagnosing the anomalies in a ball bearing by means of the acoustic vibration signals, and detecting of engine faults, or further, to the diagnoisis of anomalies in the vocal chord, speaker recognition, and speaker identification. Since a plurality of feature vectors for learning are obtained in this way for the present invention, by modifying the recognition feature vectors with the use of an a priori knowledge, the tendency for modification need be set for each field of application according to the properties of the speech or acoustic signals that are chosen as the objects of recognition. In short, the present invention may be modified in various ways within a scope which does not depart from its principal point.

The present invention is adapted for preparing a reference pattern vectors in a highly capable and efficient manner by an effective use of a small number of input patterns so that the economic propagation effects in various fields to be brought about by the invention will be considerable.

In summary, according to the present invention, a plurality of feature vectors are generated from the time series of a speech feature parameter of the input speech pattern by considering the knowledge concerning the variation tendencies of the speech patterns, to learn (prepare) reference pattern vectors for speech recognition by means of these feature speech vectors. Therefore, it becomes easy to prepare a highly reliable reference pattern vectors based on a small number of speech patterns, making it possible to aim at an improvement in the speech recognition performance accuracy. In other words, it becomes possible to plan an easy enrichment of the reference pattern vectors through an effective use of a relatively small number of input speech patterns.

In particular, the effectiveness of the present invention will be enhanced more if it is combined with a statistical pattern recognition method which is capable of collecting wider variations in the speech patterns. For instance, when the method of compound degree of similarity (multiple similarity), which was proposed in the field of character recognition and has been confirmed as to its effectiveness in the field of printed word recognition, is applied as it is to the word and speech recognition, a large number of speech patterns will be required in designing a reference pattern vectors for word recognition. However, an application of the present invention to this problem will bring a substantial effect to make it possible to obtain a satisfactory reference pattern vectors for speech recognition in a very efficient manner.

Various modifications will become possible for those skilled in the art after receiving the teachings of the present disclosure without departing from the scope thereof.

What is claimed is:

1. In a speech recognition and speech reference pattern vector learning device which obtains a first time series of a feature parameter of an input speech by analyzing the input speech, and extracts speech recognition feature vectors from a portion of the first time series of the feature parameter to recognize said input speech by collating patterns between a speech reference pattern vector registered in advance and the feature vectors for the input speech obtained in the above, a learning device of reference pattern vectors for speech recognition comprising:

a learning feature vector extracting section for extracting recognition feature vectors for the purpose of learning processing from the first time series of the feature parameter of the input speech, as well as for extracting also other feature vectors from a plurality of kinds of time series of feature parameters obtained by varying the first time series of the feature parameter; and a learning section for causing the learning of a speech reference pattern vector which is stored in a reference pattern vectors memory for recognition of said speech by means of the learning feature vectors supplied by said learning feature vector extracting section, said learning feature vector extracting section comprises a knowledge source concerning the variations in the input speech patterns, a conversion section for obtaining a plurality of kinds of time series of feature parameters by varying the first time series of the feature parameter of the input speech in accordance with the knowledge concerning the variations from the knowledge source, and a feature vector extracting section for extracting respective feature vectors from the plurality of kinds of time series and the first time series.

2. A speech recognition and speech reference pattern vector learning device as claimed in claim 1, in which said learning feature vector extracting section further comprises a speech segment detecting section for detecting each of the starting point and the ending point concerning the time series of the plurality of kinds of feature parameters.

3. A speech reference pattern vector learning device as claimed in claim 1, in which the input speech is a word speech, and said learning feature vector extracting section obtains the other speech feature vectors by increasing and decreasing the power level of the feature parameter of the analyzed input speech, by considering the power level variations in the input speech.

4. A speech recognition and speech reference pattern vector learning device as claimed in claim 1, in which the input speech is a word speech, the knowledge source is constructed for supplying knowledge concerning the level variations in the input speech, and the conversion section comprises a speech level conversion section for increasing and decreasing the level of the time series of the feature parameter for the input speech, in accordance with the knowlege concerning the level variations.

5. A speech recognition and speech reference pattern vector learning device as claimed in claim 1, in which the knowledge source comprises a noise generator for supplying knowledge concerning the noise, and the conversion section comprises a noise adding section for adding a noise from the noise generator to the time series of the feature parameter for the input speech.

6. In a speech recognition and speech reference pattern vector learning device which obtains a first time series of a feature parameter of an input speech by analyzing the input speech, and extracts speech recognition feature vectors from a portion of the first time series of the feature parameter to recognize said input speech by collating patterns between a speech reference pattern vector registered in advance and the feature vectors for the input specch obtained in the above, a learning device of reference pattern vectors for speech recognition comprising:

a learning feature vector extracting section for extracting recognition feature vectors for the purpose of learning processing from the first time series of the feature parameter of the input speech, as well as for extracting also other feature vectors from a plurality of kinds of time series of features parameters obtained by varying the first time series of the feature parameter; and a learning section for causing the learning of a speech reference pattern vector which is stored in a reference pattern vectors memory for recognition of said speech by means of the learning feature vectors supplied by said learning feature vector extracting section, said extracting section of feature vector for learning comprises a feature vector extracting section for extracting feature vectors from the time series of the feature parameter for the input speech, a knowledge source concerning the pattern variations in the input speech, and a conversion section for varying the feature vectors from the feature vector extracting section in accordance with the knowledge concerning the variations coming from the knowledge source.

7. A speech recognition and speech reference pattern vector learning device as claimed in claim 6 in which the knowledge source comprises a noise generator for supplying knowledge concerning the noise, and the conversion section comprises a noise adding section for adding a noise from the noise generator to the feature vector.

8. A speech recognition and speech reference pattern vector learning device as claimed in claim 1, in which the extracting section of feature vectors for learning comprises a noise generator for generating noises, a noise adding section for adding a noise to the input speech, a speech segment detecting section for detecting the starting and ending points of the speech concerning the time series of the feature parameter obtained from the input speech to which the noise is added, and a feature vector extracting section for extracting feature vectors from the time series.

9. A speech recognition and speech reference pattern vector learning device as claimed in claim 1, in which the pattern collection between the speech feature vector and the reference pattern vectors for speech recognition is carried out by a statistical method.

10. A speech recognition and speech reference pattern vector learning device as claimed in claim 9 in which the statistical method is the method of compound degree of similarity.

11. A speech recognition and speech reference pattern vector learning device as claimed in claim 1, in which the learning of the reference pattern vectors for speech recognition is carried out by determining covariance matrix for the learning feature speech vectors extracted from the time series of the feature parameter that is obtained by analyzing the input speech, and by supplementing or updating the reference pattern vectors for speech recognition with the reference pattern vectors computed by expanding the covariance matrix.

12. A speech recognition and speech reference pattern vector learning device as claimed in claim 4 in which the conversion section modifies the power level of the time series of the feature parameter for the analyzed input speech into three steps within the range of $+10$ dB.

13. A speech recognition and speech reference pattern vector learning device as claimed in claim 1, in which the input speech is a syllable speech.

14. A speech recognition and speech reference pattern vector learning device as claimed in claim 1, in which the input speech is a phoneme speech.

15. A speech recognition device which recognizes the input speech by the pattern matching, comprising:
an acoustic analysis section for analyzing the input speech to output it as a time series of a speech feature parameter;
a recognition feature vector extracting section for extracting an input speech feature vector for recognition out of a portion of the time series of the speech feature parameter that is sent from said acoustic analysis section;
a speech reference pattern vector memory which is memorizing in advance reference pattern vectors for speech recognition;
a pattern matching section for carrying out pattern matching between the input speech feature vector from said recognition feature vector extracting section and the reference pattern vectors in said speech reference pattern vector memory;
a learning feature vector extracting section for extracting feature vectors for recognition, for the purpose of learning processing, out of the time series of the speech feature parameter from said acoustic analysis section, as well as for extracting also other feature vectors by talking into account the variation tendencies of the learning feature vectors; and
a learning section for learning the reference pattern vectors for speech recognition in said speech reference pattern vector memory by the use of the feature vectors for learning from said learning feature vector extracting section,
said learning feature vector extracting section comprises a knowledge source concerning the pattern variations in the input speech, a conversion section for obtaining time series of a plurality of kinds of feature parameters by modifying the time series of a feature for the input speech in accordance with the knowlege from the knowledge source concerning the variations, and a feature vector extracting section for extracting respective feature vectors from the plurality of kinds of time series.

16. A speech recognition device as claimed in claim 15, in which said learning feature vector extracting section further comprises a speech segment detecting section for detecting each of the starting and ending points of the speech concerning the time series of plurality of kinds of the feature parameters.

17. A speech recognition device as claimed in claim 15, in which the input speech is a word speech, the knowledge source is constructed for supplying knowledge concerning the variations in the level of the input speech, and the conversion section comprises a speech level conversion section for increasing and decreasing the level of the time series of the feature parameter for the input speech, in accordance with the knowledge concerning the level variations.

18. A speech recognition device as claimed in claim 15, in which the knowledge source comprises a noise generator for supplying knowledge concerning the noise, and the conversion section comprises a noise adding section for adding a noise from the noise generator to the time series of the feature parameter for the input speech.

19. A speech recognition device which recognize the input speech by the pattern matching, comprising:
an acoustic analysis section for analyzing the input speech to output it as a time series of a speech feature parameter;
a recognition feature vector extracting section for extracting an input speech feature vector for recognition out of a portion of the time series of the speech feature parameter that is sent from said acoustic analysis section;
a speech reference pattern vector memory which is memorizing in advance reference pattern vectors for speech recognition;
a pattern matching section for carrying out pattern matching between the input speech feature vector from said recognition feature vector extracting section and the reference pattern vectors in said speech reference pattern vector memory;
a learning feature vector extracting section for extracting feature vectors for recognition, for the purpose of learning processing, out of the time series of the speech feature parameter from said acoustic analysis section, as well as for extracting also other feature vectors by taking into account the variation tendencies of the learning feature vectors; and
a learning section for learning the reference pattern vectors for speech recognition in said speech reference pattern vector memory by the use of the feature vectors for learning from said learning feature vector extracting section, said extracting section of feature vector for learning comprises a feature vector extracting section for extracting feature vectors from time series of the feature parameter for the input speech, a knowledge source concerning the pattern variations in the input speech, and a conversion section for modifying the learning feature vector from the learning feature vector extracting section in accordance with the knowledge concerning the variations coming from the knowledge source.

20. A speech recognition device as claimed in claim 15, in which the pattern matching between the speech feature vectors and the reference pattern vectors for speech recognition is carried out by a statiscal method.

21. A speech recognition device as claimed in claim 20, in which the statistical method is the method of multiple similarity 22. A speech recognition device as claimed in claim 15, in which the learning of the reference pattern vectors for speech recognition is carried out by determining covariance matrix for the learning feature speech vectors extracted from the time series of the feature parameter that is obtained by analyzing the input speech, and by supplementing or updating the reference pattern vectors for speech recognition with the reference pattern vectors computed by expanding the covariance matrix.

23. A speech recognition device as claimed in claim 17, in which the conversion section modifies the power level of the time series of the feature parameter for the analyzed input speech into three steps within the range of ±10 dB.

24. A speech recognition device as claimed in claim 15, further comprising:

a noise generator for generating noise; and
a noise adding section for adding the noise to the input speech.

25. In a speech recognition device having a learning method of reference pattern vectors for speech recognition which obtains the time series of a feature parameter of an input speech by analyzing the input speech, extracts speech recognition feature vectors from a portion of the time series of the feature parameter, and recognizes said input speech by collating the patterns between reference pattern vectors for speech recognition that has been registered in advance and the feature vectors for the input speech obtained in the above, said learning method of reference pattern vectors for speech recognition comprising the steps of:

(a) extracting out from the time series of the features parameter obtained by analyzing the input, speech, a speech feature vector for the pattern matching and speech feature vectors for learning consisting of other speech feature vectors that correspond to the variation tendencies of the speech feature vector mentioned; and (b) learning the reference pattern vectors for speech recognition by the use of the speech feature vector and the other feature vectors that correspond to the variation tendencies of the feature vector.

26. A learning method of reference pattern vectors for speech recognition as claimed in claim 25, including the step of:

obtaining the other speech feature vectors by increasing and decreasing the power level of the feature parameter for the analyzed input speech by taking into account the variations in the power level of the input speech.

27. A learning method of reference pattern vectors for speech recognition as claimed in claim 25, including the step of:

matching the patterns between the speech feature vectors and the reference pattern vectors for speech recognition by a statistical method.

28. A learning method of reference pattern vectors for speech recognition as claimed in claim 27, in which the statistical method is the method of compound degree of similarity.

29. A learning method of reference pattern vectors for speech recognition as claimed in claim 25, wherein the step of learning of the reference pattern vectors further includes the steps of:

determining a covariance matrix for the speech feature vectors for learning that are extracted from the time series of the feature parameter obtained by analyzing the input speech, and supplementing or updating the reference pattern vectors for speech recognition with a reference pattern vectors computed by expanding the covariance matrix.

30. A learning method of reference pattern vectors for speech recognition as claimed in claim 26, including the step of:

obtaining the other speech feature vectors from the power level of the feature parameter for the analyzed input speech by modifying the power level into three steps within the range of ±10 dB.

31. A learning method of reference pattern vectors for speech recognition as claimed in claim 25, in which the input speech is a syllable speech.

32. A learning method of reference pattern vectors for speech recognition as claimed in claim 25, in which the input speech is a phoneme speech.

33. A learning method of reference pattern vectors for speech recognition as claimed in claim 25, in which the speech feature vector for learning further comprise speech feature vectors to be used for pattern matching and speech feature vectors obtained by adding the influence of noises to other speech feature vectors.

34. A learning method of reference pattern vectors for speech recognition as claimed in claim 33, including the step of:

adding the noises with predetermined levels to the input speech, the time series of the feature parameter obtained by analyzing the input speech, and the speech feature vectors that are extracted from the time series of the feature parameter for the addition of the influence due to noises.

* * * * *